April 4, 1944. A. N. SOMERS 2,345,777
OPTICAL DEVICE TO REDUCE GLARE
Filed Oct. 24, 1941

Inventor
Amos N. Somers.
By attorney

Patented Apr. 4, 1944

2,345,777

UNITED STATES PATENT OFFICE 2,345,777

OPTICAL DEVICE TO REDUCE GLARE

Amos N. Somers, Westboro, Mass.

Application October 24, 1941, Serial No. 416,347

1 Claim. (Cl. 88—41)

This invention relates to devices by which the glare of strong white light may be reduced and substantially eliminated.

To the accomplishment of this general object, I provide an optical device which includes a combination of color discs or filters so arranged and related that normal white light, such as sunlight or electric light, will be modified by passing through the discs and will issue from the device as a modified white light which is substantially without glare.

Such an optical device is obviously useful for many different purposes and I have shown the invention in this application as embodied in spectacles, in automobile headlights, and in electric bulbs.

The invention in these several embodiments is disclosed in the drawing, in which Fig. 1 is a sectional elevation showing a general form of my invention;

Figure 1:
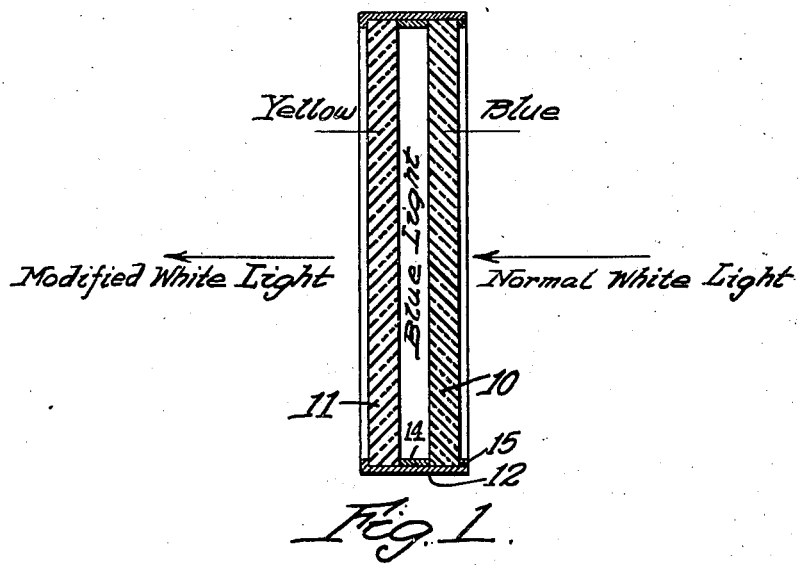

Referring to Fig. 1, my improved optical device comprises a transparent blue disc 10, a transparent yellow disc 11, and a casing 12 in which the two discs are mounted. An annular spacing band 14 is preferably provided between the discs 10 and 11, and a locking ring 15 holds the parts in assembled relation.

The discs 10 and 11 will be of colored glass or of some other suitable transparent medium, and for general purposes these discs are preferably flat, so that the light rays passing through the device will not be diverted nor distorted but will be modified by the elimination of certain color rays. The device is to be used with the light passing from right to left, as viewed in Fig. 1, and traversing the blue disc before it passes through the yellow disc.

In the use of my improved optical device, normal white light, such as is developed by the sun or by an electric light, first passes through the blue disc by which many of the color rays and particularly the red rays are filtered out, so that the light rays leaving the disc 10 are of a bluish color. These rays then pass through the yellow disc 11, which is complementary to the blue disc.

The light as it leaves the yellow disc is a modified white light, with certain of the irritating color elements filtered out.

The blue and yellow discs will be of such density and depth of color that the desired results will be effectively attained.

It is found in actual use that this modified white light somewhat resembles very early twilight and is very restful to the eyes. Glare is eliminated, even when viewing an approaching headlight or other source of normal white light.

The width of the spacing band 14 is important, as the clearest vision is secured when the discs are spaced apart by a distance substantially equal to the wave length of the light transmitted through the blue disc. With the discs thus spaced, very clear vision is secured, while at a greater or less spacing, the clearness is to some extent impaired.

Figures 2, 3:
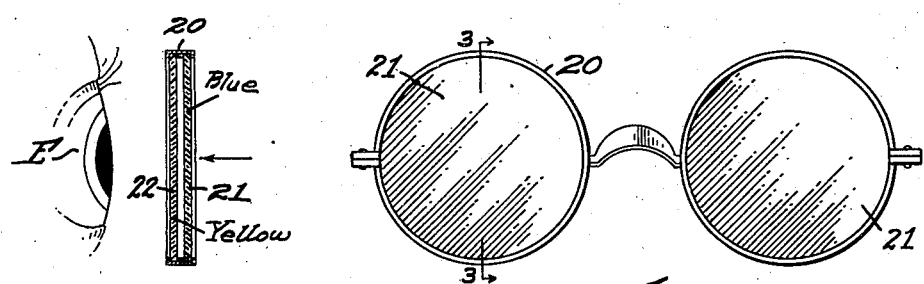
Fig. 2 is a front elevation of a pair of spectacles in which the invention is embodied.
Fig. 3 is a sectional side elevation, taken along the line 3—3 in Fig. 2.

In Fig. 2, I have shown my invention embodied in a pair of spectacles or sun glasses comprising a frame 20 in which a blue disc 21 and yellow disc 22 are mounted in spaced relation, with the spacing corresponding to the wave length of blue light and with the blue disc remote from the eye E, so that the light enters the blue disc first.

Figure 4:
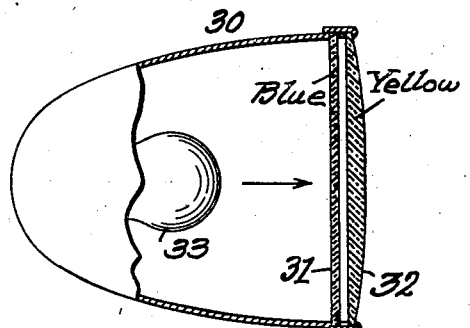
Fig. 4 is a side elevation, partly in section, of an automobile headlight embodying my invention.

In Fig. 4, I have shown the invention embodied in an automobile headlight comprising a casing 30 in which a blue disc 31 and a yellow disc 32 are mounted in spaced relation, with the blue disc nearer to the electric bulb 33 which constitutes the source of light.

Figure 5:
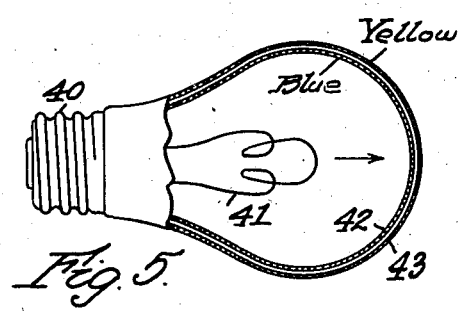
Fig. 5 is a side elevation, partly in section, of an electric light bulb also embodying my invention.

In Fig. 5, the invention is embodied in an electric light bulb comprising a base 40 supporting a filament 41 within a transparent blue bulb 42, which in turn is surrounded by a transparent yellow bulb 43 mounted in spaced relation thereto.

The spacing between the discs 31 and 32 in Fig. 4 and between the bulbs 42 and 43 in Fig. 5 preferably corresponds to the wave length of blue light, as previously described.

Many other practical applications of the invention will occur to those skilled in the art.

The important advantage of my invention lies in the fact that the light issuing from the device is not colored nor tinted so as to change the natural appearance of objects viewed therethrough, but is a white light so modified by the filtering action of the blue and yellow discs that certain color rays are filtered out and glare is substantially eliminated.

Having thus described my invention and the advantages thereof, I do not wish to be limited to the details herein disclosed, otherwise than as set forth in the claim, but what I claim is:

In glare-reducing spectacles having a frame and a pair of double lenses mounted in laterally spaced relation in said frame, that improvement which comprises providing each double lens with a transparent yellow disc positioned in said frame nearer the eye of the wearer, a transparent blue disc positioned in said frame more remote from the eye of the wearer, means to secure said discs in said frame with the adjacent faces of the transparent discs in each pair uniformly spaced apart by substantially the wave length of the color in the blue disc, and the yellow and blue colors in the discs of each pair being optically related to jointly coact on the transmitted light and to thereby transform a glaring white light into a modified white light of greatly reduced glare and on the order of early twilight.

AMOS N. SOMERS.